United States Patent
Hitachi et al.

[11] Patent Number: 5,992,904
[45] Date of Patent: *Nov. 30, 1999

[54] BRANCH PIPE JOINT FOR HIGH-PRESSURE FLUIDS

[75] Inventors: Yuzo Hitachi; Eiji Watanabe, both of Tagata-gun, Japan

[73] Assignee: Usui Kokusai Sangyo Kaisha, Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/976,871

[22] Filed: Nov. 24, 1997

[30] Foreign Application Priority Data

Dec. 7, 1996 [JP] Japan .................................. 8-342541

[51] Int. Cl.⁶ .................................................. F16L 25/00
[52] U.S. Cl. .................. 285/332; 285/133.3; 285/133.4; 285/148.27; 285/354
[58] Field of Search .................................. 285/197, 198, 285/148.27, FOR 160, 33 L, 133.3, 133.4, 354

[56] References Cited

U.S. PATENT DOCUMENTS

| | | | |
|---|---|---|---|
| Re. 009,730 | 5/1881 | Holly | 285/148.27 |
| Re. 012,688 | 8/1907 | Oakes | 285/148.27 |
| 1,908,821 | 5/1933 | Cornell | 285/197 |
| 2,295,416 | 9/1942 | Madison | 285/148.27 |
| 3,263,244 | 8/1966 | Katz | 285/148.27 |
| 3,894,757 | 7/1975 | Best | 285/189 |
| 4,179,141 | 12/1979 | Newman | 285/189 |
| 4,832,376 | 5/1989 | Sugao . | |
| 4,893,601 | 1/1990 | Sugao . | |
| 4,900,180 | 2/1990 | Takikawa . | |
| 5,120,084 | 6/1992 | Hashimoto . | |
| 5,143,410 | 9/1992 | Takikawa . | |
| 5,169,182 | 12/1992 | Hashimoto . | |
| 5,172,939 | 12/1992 | Takikawa . | |
| 5,261,705 | 11/1993 | Takahashi et al. | 285/197 |
| 5,316,349 | 5/1994 | Rafeld | 285/148.27 |
| 5,667,225 | 9/1997 | Kato . | |

FOREIGN PATENT DOCUMENTS

| | | |
|---|---|---|
| 2-80289 | 6/1990 | Japan . |
| 3-177693 | 8/1991 | Japan . |
| 4-175462 | 6/1992 | Japan . |

*Primary Examiner*—Dave W. Arola
*Attorney, Agent, or Firm*—Anthony J. Casella; Gerald E. Hespos

[57] ABSTRACT

A branch pipe joint for a high pressure fluid, comprising: a joint body having a conduit therein on its axis and a branch hole formed in its circumferential wall and having a pressure receiving seat formed on the circumferential face thereof and opened to the outside; a branch pipe having a conduit to communicate with the conduit of said joint body and including a joint head formed at the end thereof and forming a pressure seat so that said branch pipe is engaged with said joint body by bringing the pressure seat thereof into abutment against the pressure receiving seat of said joint body; a joint portion made integral with or separate from said joint body; and a nut assembled in advance in said branch pipe and fastened into said joint portion against the pressure of said joint head thereby to joint said branch pipe to said main pipe. The branch hole at said joint body is formed into an elliptical hole having a longer diameter in the radial direction of said joint body and aligned with the center of the conduit of said joint body.

14 Claims, 6 Drawing Sheets

BRANCH PIPE JOINT FOR HIGH-PRESSURE FLUIDS

BACKGROUND OF THE INVENTION

1. Field of the Invention

The present invention relates to a branch joint for a high-pressure fluid (e.g., a fluid under a high pressure over 1,000 Kgf/cm$^2$) to be used in a cutter or a washer using high-pressure water, a hydraulic working machine, or a high-pressure hydraulic apparatus.

2. Description of the Prior Art

In one of this kind of branch pipe joint of the prior art, as shown in FIGS. 7 and 8, a joint body 11 having a conduit 11-1 therein on its axis is equipped with a boss 11-4 which has a branch hole 11-2 on the center line of the conduit 11-1. This branch hole 11-2 has a circumference communicating with the conduit 11-1 and opened to the outside to form a pressure receiving seat 11-3. A pressure seat 12-3, as formed on a joint head 12-2 of a branch pipe 12, is brought into abutting engagement with the pressure receiving face 11-3 of the joint body 11, so that the branch pipe 12 is connected to the joint body 11 by fastening a cap nut 13 on the boss 11-4 through a fastening washer 14 screwed on the leading end of the branch pipe 12. The joint body 11 is provided at each of its two ends with a pressure receiving face 11-5 which is formed in the opening of the conduit 11-1, as in the joint structure of the branch pipe. This pressure receiving face 11-5 is formed on the circumference of the conduit 11-1 and opened to the outside. A pressure seat 15-3, as formed on the joint head 15-2 of a main pipe 15, is brought into abutting engagement with the pressure receiving face 11-5 of the joint body 11, so that the main pipe 15 is connected to the joint body 11 by fastening a cap nut 16 on the joint body 11 through a fastening washer 17 screwed on the leading end of the main pipe 15. Reference numeral 12-1 designates a conduit of the branch pipe, and numeral 15-1 designates the conduit of the main pipe 15.

In the high-pressure fluid branch pipe joint of the prior art in which the branch hole 11-2 having a circular section is formed in the joint body 11 in alignment with the conduit 11-1 of the joint body 11, however, the highest stress is established at the open end P of the conduit 12-1 of the branch pipe 12 at the joint body conduit 11-1 when the internal pressure acts upon the joint body 11, so that a crack is liable to start from the open end P thereby to invite a leakage of the fluid.

SUMMARY OF THE INVENTION

The invention has been conceived in view of the aforementioned problems of the high-pressure fluid branch pipe joint of the prior art and has an object to provide a branch pipe joint for a high-pressure fluid, which is enabled to improve the strength against the internal pressure fatigue by lowering the maximum stress to be established in the joint body open end of the conduit of the branch hole.

According to a first embodiment of the invention, there is provided a branch pipe joint for a high pressure fluid, comprising: a joint body having a conduit therein on its axis and a branch hole formed in its circumferential wall and having a pressure receiving seat formed on the circumferential face thereof and opened to the outside; a branch pipe having a conduit to communicate with the conduit of the joint body and including a joint head formed at the end thereof and forming a pressure seat so that the branch pipe is engaged with the joint body by bringing the pressure seat thereof into abutment against the pressure receiving seat of the joint body; a joint portion made integral with or separate from the joint body; and a nut assembled in advance in the branch pipe and fastened into the joint portion against the pressure of the joint head thereby to joint the branch pipe to the main pipe, wherein the branch hole at the joint body is formed into an elliptical hole having a longer diameter in the radial direction of the joint body and aligned with the center of the conduit of the joint body.

According to a second embodiment of the invention, there is further provided a branch pipe joint for a high pressure fluid, comprising: a joint body having a conduit therein on its axis and a branch hole formed in its circumferential wall and having a pressure receiving seat formed on the circumferential face thereof and opened to the outside; a branch pipe having a conduit to communicate with the conduit of the joint body and including a joint head formed at the end thereof and forming a pressure seat so that the branch pipe is engaged with the joint body by bringing the pressure seat thereof into abutment against the pressure receiving seat of the joint body; a joint portion made integral with or separate from the joint body; and a nut assembled in advance in the branch pipe and fastened into the joint portion against the pressure of the joint head thereby to joint the branch pipe to the main pipe, wherein the branch hole at the joint body is formed into an elliptical hole having a longer diameter in the radial direction of the joint body and offset in the radial direction of the conduit of the joint body.

In the invention, it is based on the result of the numerous experiments, as repeated by us, that the branch hole to be formed in the joint body is formed into the elliptical hole having a longer diameter in the radial direction of the joint body, and that the elliptical hole is offset in the radial direction of the conduit of the joint body.

Specifically, with a view to reducing the maximum value of the stress to be established at the open end of the branch hole, as opened into the conduit of the joint body, we examined the individual stress concentration portions and maximum stresses when the internal pressure is applied to the individual pipes, by employing the pipes of a circular section used as the joint body of the actual high-pressure fluid branch pipe joint, by forming the branch holes of circular and elliptical shapes, and by orienting the longer diameter of the elliptical holes in the radial direction and in the axial direction of the joint body. These examinations have revealed that a high stress was established at the axial two ends of the opening of the branch hole having the section of true circularity, as described hereinbefore, when the branch hole was aligned with the center of the conduit of the pipe having a circular section. When the branch hole of an elliptical shape having a longer diameter in the radial direction of the pipe of a circular section was aligned with the center of the conduit of the pipe, on the other hand, the stress value at the two axial ends of the opening of the elliptical hole in the inner circumference of the pipe could be made far lower than that of the case of the aforementioned branch hole of true circularity. It has also been revealed that even the elliptical hole experienced, if oriented (in the longer diameter) in the axial direction of the pipe having the circular section, a far higher stress than that of the case of the branch hole of a shape of true circularity at the open end of the branch hole in the inner circumference of the pipe, so that it could not be adopted in the least.

We also have examined the stress concentration portion and the maximum stress on the case in which the elliptical branch hole having a longer diameter in the radial direction of the pipe having a circular section was offset in the radial direction of the conduit of the joint body. As a result, at the open end of the elliptical branch hole in the inner circumference of the pipe, there was established a stress which was as high as that of the case in which the elliptical branch hole was placed on the center axis of the pipe. It also has been revealed that this structure was especially effective for reducing the stress as in the foregoing case, so that the stress at the branch hole when the internal pressure acted upon the joint body could be drastically reduced.

In the invention, as has been described hereinbefore, the branch hole to be mounted on the joint body having a circular shape is formed into an elliptical hole having a longer diameter in the radial direction of the conduit of the joint body and is offset in the radial direction of the conduit of the joint body, so that the establishment of the stress at the branch hole can be effectively suppressed to improve the strength against the internal pressure fatigue drastically in each branch pipe mounting portion. Here, the ellipse in the invention should include a race track shape.

DETAILED DESCRIPTION OF THE PREFERRED EMBODIMENTS

Figure 1:
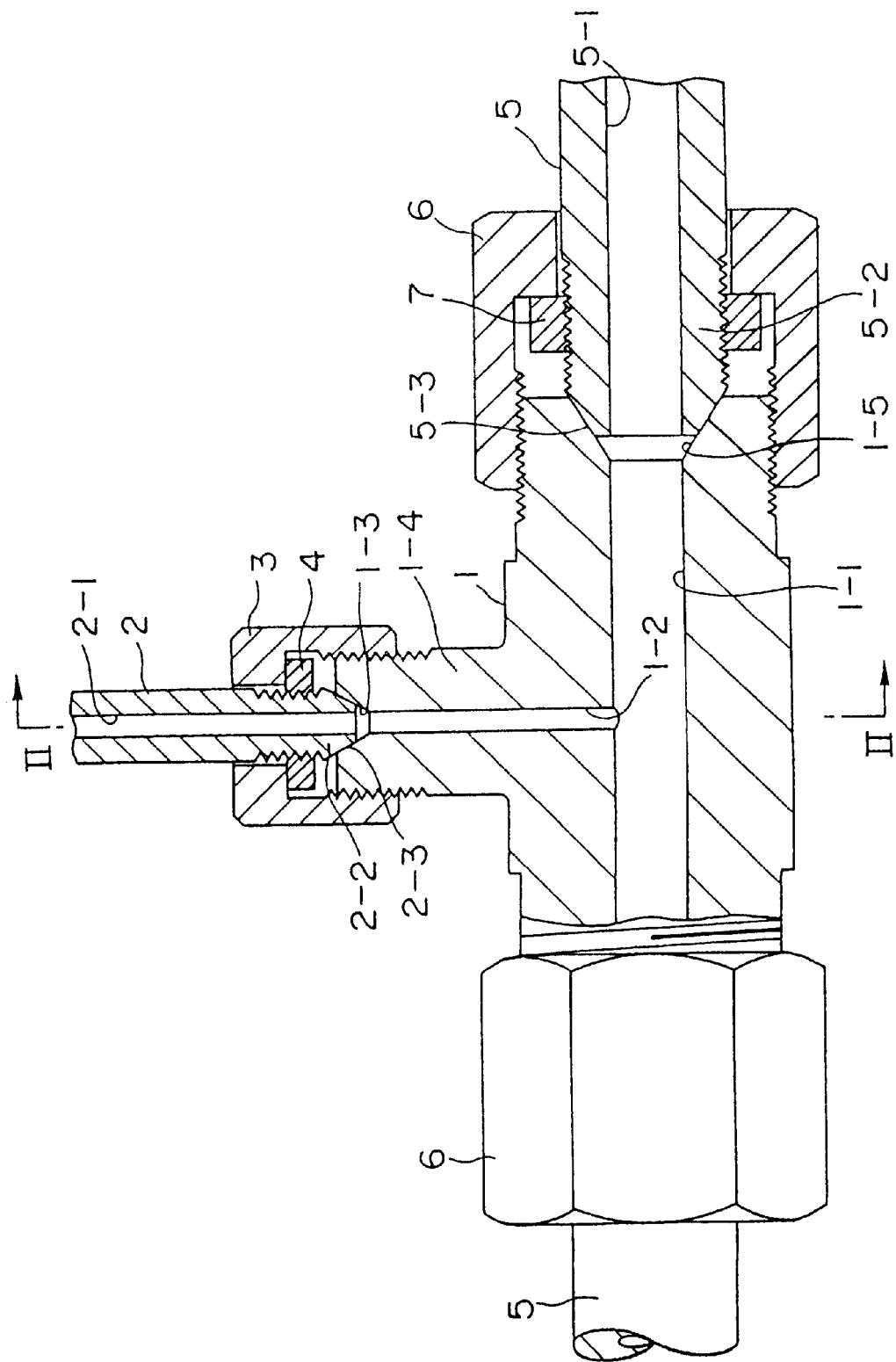
FIG. 1 is a longitudinally sectional side elevation showing a portion of a joint structure of a branch pipe in a branch pipe joint for a high-pressure fluid according to a first embodiment of the invention.

The invention will be described with reference to FIGS. 1 to 6. Reference numeral 1 designates a joint body as a branch pipe joint for a high-pressure fluid; numeral 2 designates a branch pipe; numerals 3 and 6 designate cap nuts; numerals 4 and 7 designate fastening washers; and numeral 5 designates a main pipe.

The joint body 1 as the high-pressure fluid branch pipe joint has therein a conduit 1-1 on its axis and is equipped with a boss 1-4 as a joint portion having a branch hole 1-2 in the axial direction in its circumferential wall. This branch hole 1-2 is an elliptical hole communicating with the conduit 1-1 and having a circumferential face opened to the outside and formed into a pressure receiving face 1-3. The branch hole is formed, as shown in FIG. 3, into the elliptical hole which has a longer diameter in the radial direction of the joint body 1, and each pressure receiving face 1-3 is a generally conical face for connecting a pressure face having a generally conical face, as will be described hereinafter.

Figure 2:
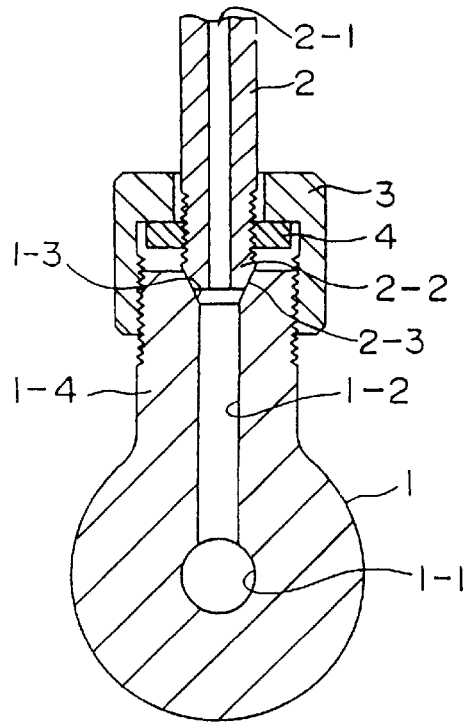
FIG. 2 is a longitudinally sectional front elevation taken along line II—II of FIG. 1.
Figure 3:
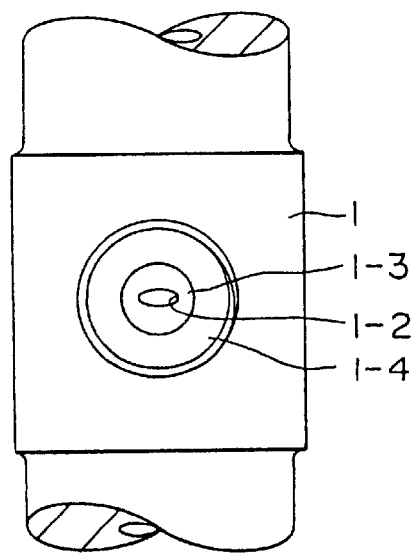
FIG. 3 is a top plan view showing a branch hole portion of a joint body in the same joint structure of the branch pipe.

In the embodiment of the joint structure of the branch pipe shown in FIGS. 1, 2 and 3, as in the prior art, the branch pipe 2 is has therein a conduit 2-1 to communicate with the conduit 1-1 and at its end portion a pressure seat 2-3 which is formed by a joint head 2-2 having a tapered conical shape. In this joint structure, the pressure seat 2-3, as formed on the joint head 2-2 of the branch pipe 2, is brought into abutting engagement with the pressure receiving seat 1-3 of the joint body 1 so that the branch pipe 2 is connected to the joint body 1 by fastening the cap nut 3 on the boss 1-4 through the fastening washer 4 screwed on the leading end of the branch pipe 2. At each of the two ends of the joint body 1, like the joint structure of the branch pipe, the conduit 1-1 has at its opening a circumference opened to the outside and formed into a pressure receiving seat 1-5. A pressure seat 5-3, as formed on a joint head 5-2 of the main pipe 5, is brought into abutting engagement with the pressure receiving face 1-5 of the joint body 1 so that the main pipe 6 is connected to the joint body 1 by fastening the cap nut 6 on the joint body 1 through the fastening washer 7 screwed on the leading end of the main pipe 5. Numeral 5-1 designates a conduit of the main pipe 15. Here, the size of the branch hole 1-2 of an elliptical hole is properly determined according to the fluid pressure, the flow rate, the pressure loss, the diameter and thickness of the joint body 1 and so on.

Figure 4:
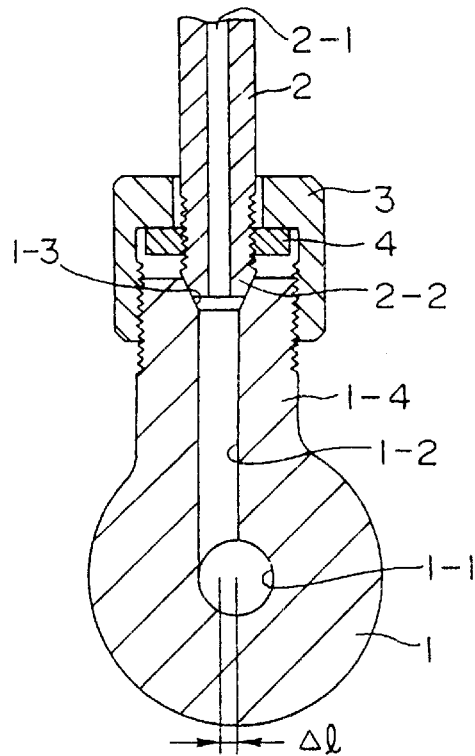
FIG. 4 is similar to FIG. 2 but shows a second embodiment of the invention.
Figure 5:
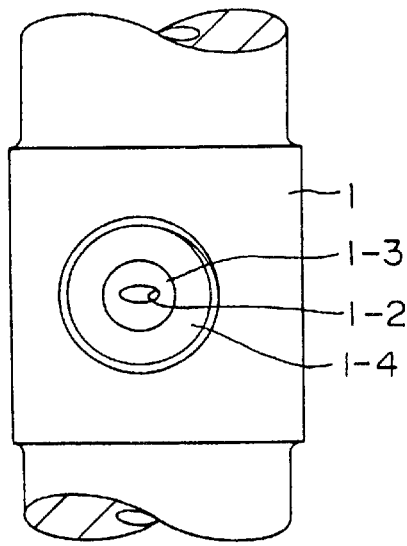
FIG. 5 is a top plan view showing a branch hole of a joint body according to the joint structure of the branch pipe of FIG. 4.

In the joint structure of the branch pipe in a branch pipe joint for a high-pressure fluid according to a second embodiment of the invention, as shown in FIGS. 4 and 5, the boss 1-4 has the branch hole 1-2 which is made of an elliptical hole similar to the aforementioned one and communicating with the conduit 1-1 of the joint body 1 with an eccentricity $\Delta 1$ from the center of the joint body 1. The branch hole 1-2 has a circumferential face opened to the outside and formed into the pressure receiving face 1-3. In this joint structure, too, the branch hole 1-2 is formed, as shown in FIG. 5, into the elliptical hole which has a longer diameter in the radial direction of the joint body 1, and the pressure receiving face 1-3 is a generally conical face for connecting the pressure face having a generally conical face similar to the aforementioned one. In this high-pressure fluid branch pipe joint, moreover, the size of the branch hole 1-2 having the elliptical shape is properly determined according to the fluid pressure, the flow rate, the pressure loss, the diameter and thickness of the joint body 1 and so on. Still moreover, the eccentricity $\Delta 1$ of each branch hole is not especially restricted but is so preferably determined for reducing the stress P to be established a the open end of the branch hole 1-2 at the conduit 1-1 that the tangent of the inner wall of the conduit 1-1 of the joint body 1 is substantially aligned with that of the inner face of the branch hole 1-2, as shown in FIG. 5.

Figure 6:
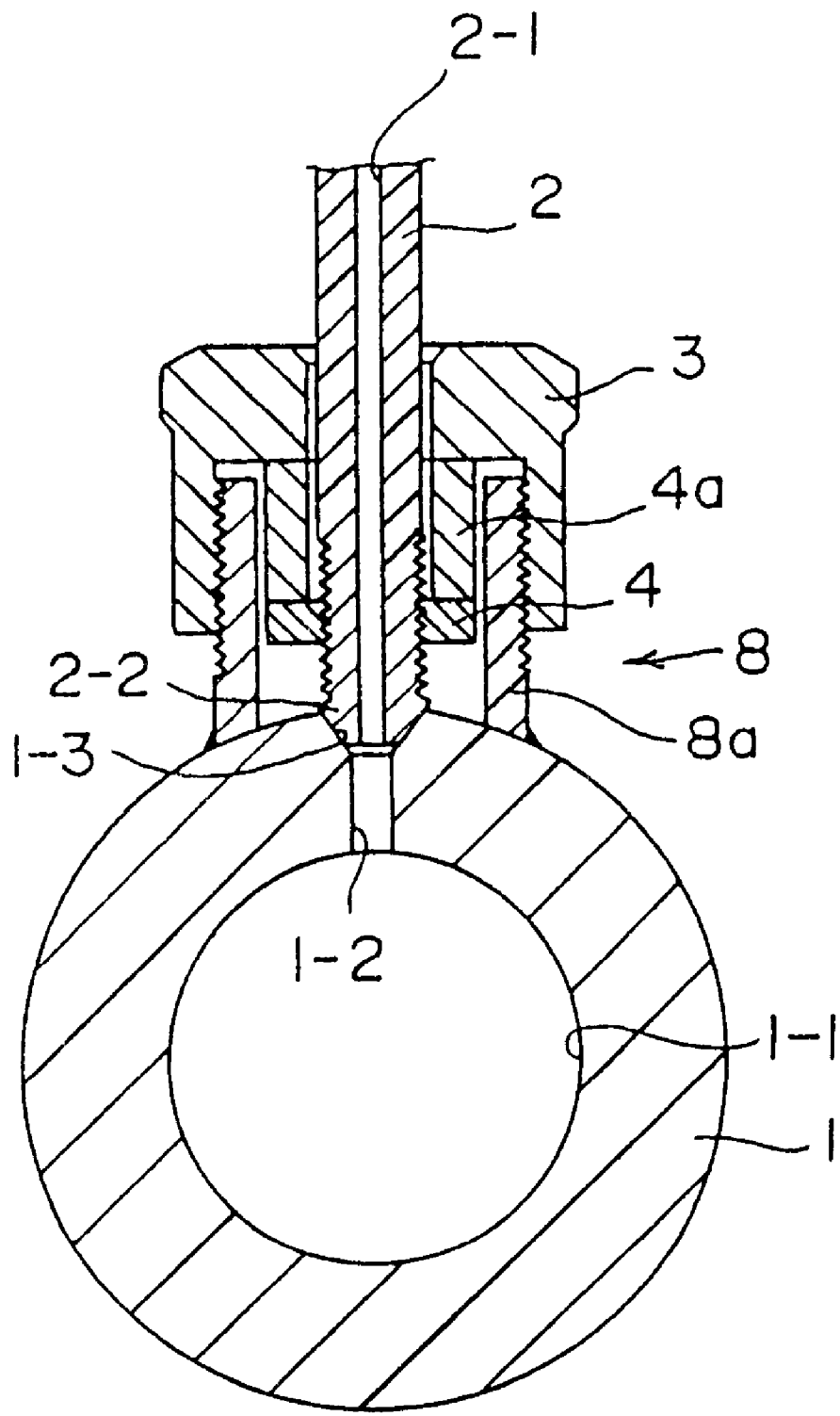
FIG. 6 is a longitudinally sectional side elevation showing another example of the joint structure of a branch pipe in the high-pressure fluid branch pipe joint of the invention.
Figure 7:
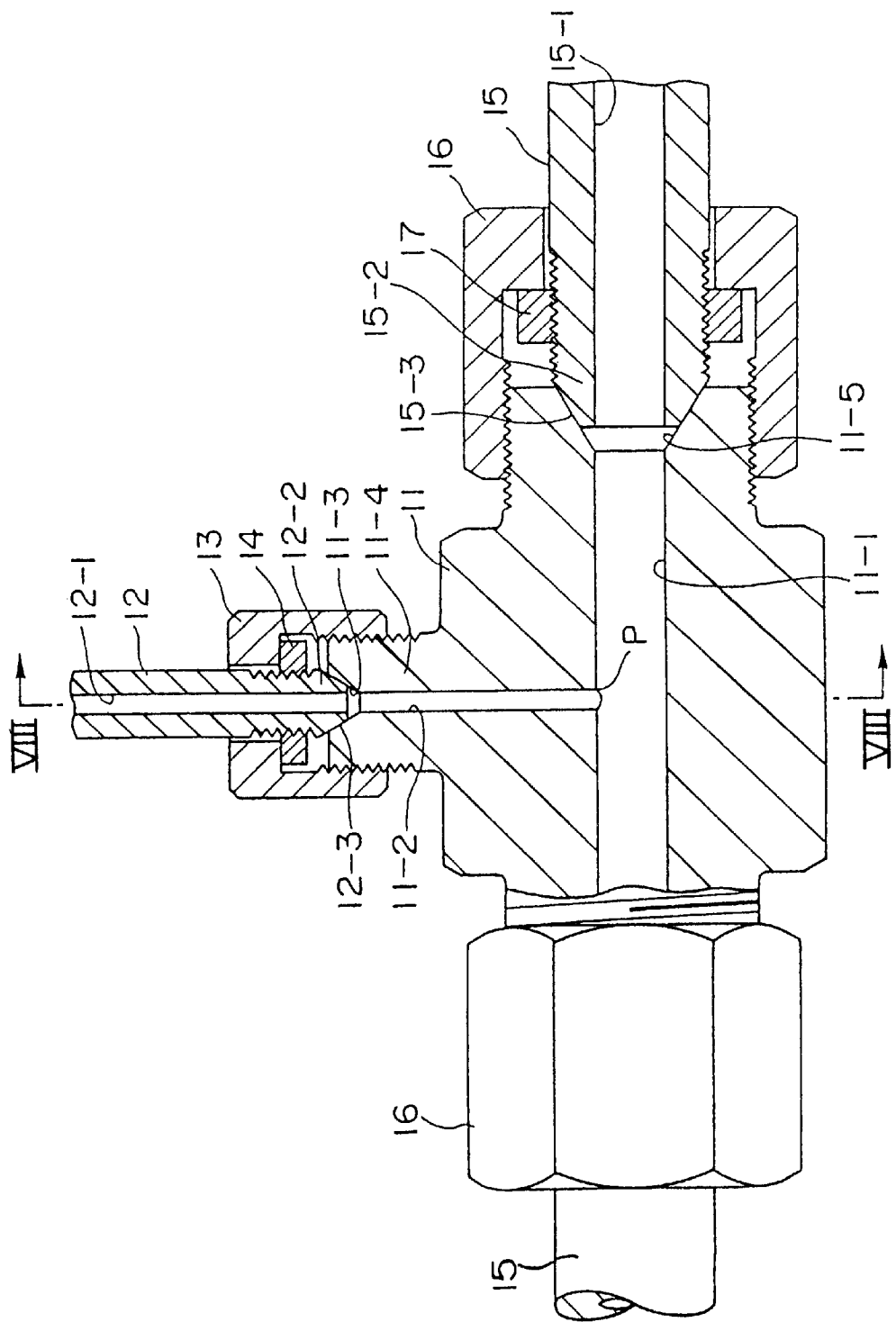
FIG. 7 is a partially cut-away front elevation showing the branch pipe joint portion of the high-pressure fluid branch pipe joint of the prior art.
Figure 8:
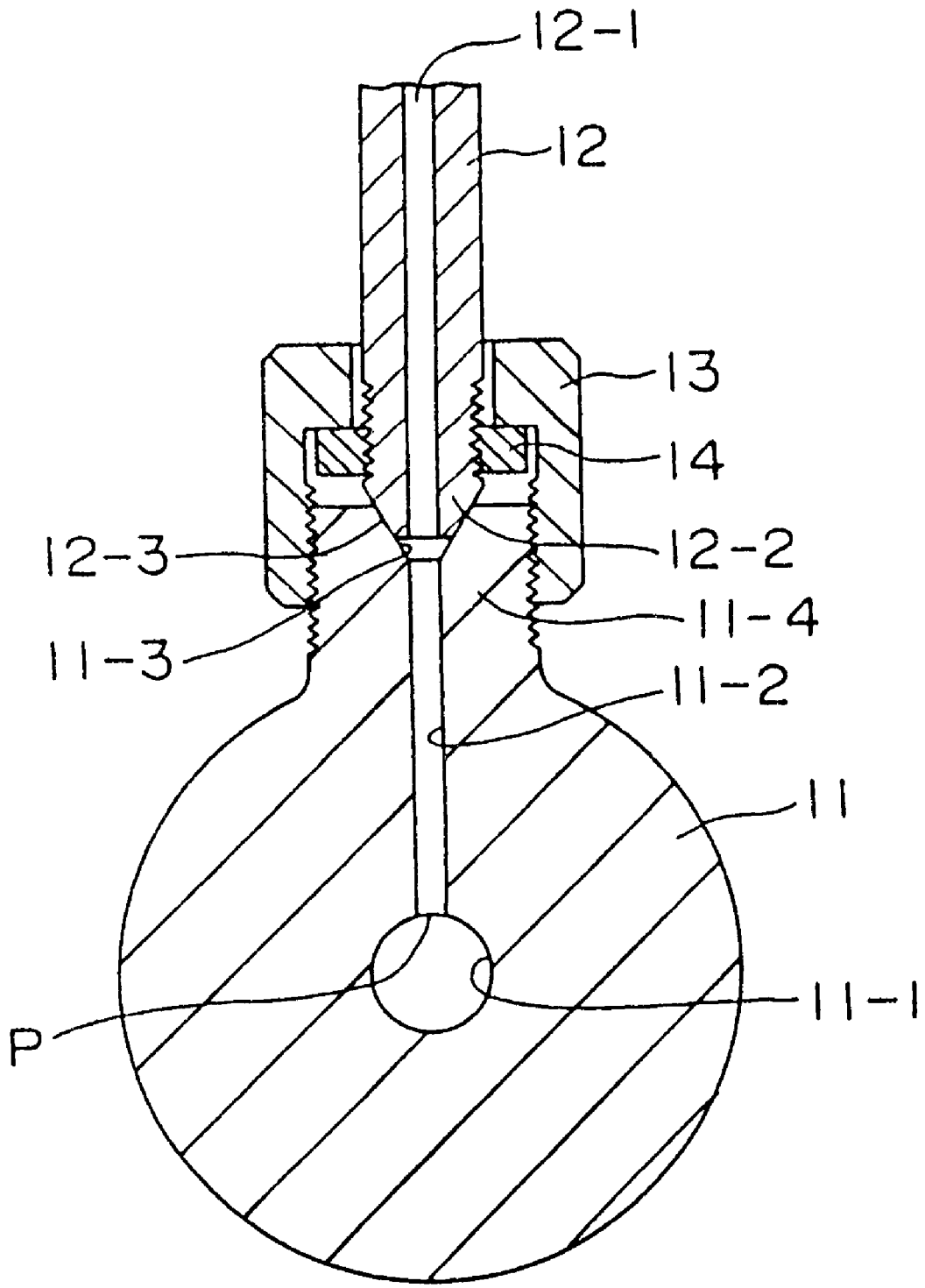
FIG. 8 is a longitudinally sectional front elevation taken along line VIII—VIII of FIG. 7.

In the joint structure of the branch pipe in a branch pipe joint for a high-pressure fluid, as shown in FIG. 6, a joint portion 8 is constructed by bringing the end face of a sleeve nipple 8a separate from the joint body 1 into engagement with the outer circumference of the joint body 1 to solder the former to the latter and by interposing a sleeve washer 4a between the fastening washer 4 and the inner face of the cap nut 3.

As has been described hereinbefore, the high-pressure fluid branch pipe joint of the invention is constructed such that the branch hole to be formed in the joint body having the circular section are formed into elliptical hole having a longer diameter in the radial direction of the joint body, and such that the elliptical branch hole is offset in the radial direction of the conduit of the joint body. As a result, the stress to be established at the open end, as opened into the joint body, of the conduit of the joint body can be reduced. It is made possible to exhibit reliable and stable functions by the high strength against the internal pressure fatigue at the branch hole, by the excellent durability and by no fluid leakage due to the crack, thereby to provide a remarkably useful high-pressure fluid branch pipe joint.

We claim:

1. A branch pipe joint for a high pressure fluid, comprising:
   a joint body having an inner circumferential wall defining a first conduit, said first conduit extending along an axis, a branch hole, said branch hole being formed in said circumferential wall, and a pressure receiving seat;
   a branch pipe having a second conduit and a joint head formed at the end thereof, said joint head defining a pressure seat, said pressure seat being formed to abuttingly engage said pressure receiving seat;
   a generally tubular joint portion extending from said joint body and disposed to encircle said pressure receiving seat; and
   a nut coupling said branch pipe to said joint portion with said pressure seat being in abutting engagement with said pressure receiving seat, thereby to join said branch pipe to said joint body,
   wherein said branch hole is formed with an elliptical shape having a longer diameter disposed in a direction generally normal to said axis, and said branch hole being aligned with the center of the first conduit of said joint body.

2. A branch pipe joint for a high-pressure fluid according to claim 1,
   wherein said joint portion is formed integrally with said joint body.

3. A branch pipe joint for a high-pressure fluid according to claim 1,
   wherein said joint portion is formed separately from said joint body.

4. A branch pipe joint for a high pressure fluid, comprising:
   a joint body having an inner circumferential wall defining a first conduit, said first conduit extending along an axis, a branch hole, said branch hole being formed in said circumferential wall, and a pressure receiving seat;
   a branch pipe having a second conduct and a joint head formed at the end thereof, said joint head defining a pressure seat, said pressure seat being formed to abuttingly engage said pressure receiving seat;
   a generally tubular joint portion extending from said joint body and disposed to encircle said pressure receiving seat; and
   a nut coupling said branch pipe to said joint portion with said pressure seat being in abutting engagement with said pressure receiving seat, thereby to join said branch pipe to said joint body,
   wherein said branch hole is formed with an elliptical shape having a longer diameter disposed in a direction generally normal to said axis, and said branch hole being offset from the center of the first conduit of said joint body in the direction generally normal to said axis.

5. A branch pipe joint for a high-pressure fluid according to claim 4,
   wherein said branch hole is formed with two ends spaced apart along said longer diameter, and wherein the offset of said branch hole is so determined that the tangent of said circumferential wall is substantially aligned with one said end of said branch hole.

6. A branch pipe joint for a high-pressure fluid according to claim 4,
   wherein said joint portion is formed integrally with said joint body.

7. A branch pipe joint for a high-pressure fluid according to claim 4,
   wherein said joint portion is formed separately form said joint body.

8. A branch pipe joint for a high pressure fluid, comprising:
   a joint body having an inner circumferential wall defining a first conduit, said first conduit extending along an axis, and a branch hole, said branch hole being formed in said circumferential wall;
   a generally tubular joint portion extending from said joint body and terminating in a pressure receiving seat;
   a branch pipe having a second conduit and a joint head formed at the end thereof, said joint head defining a pressure seat, said pressure seat being formed to abuttingly engage said pressure receiving seat; and
   a nut coupling said branch pipe to said joint portion with said pressure seat being in abutting engagement with said pressure receiving seat, thereby to join said branch pipe to said joint body,
   wherein said branch pipe is formed with an elliptical shape having a longer diameter disposed in a direction generally normal to said axis, and said branch hole being aligned with the center of the first conduit of said joint body.

9. A branch pipe joint for a high-pressure fluid according to claim 8, wherein said joint portion is formed integrally with said joint body.

10. A branch pipe joint for a high-pressure fluid according to claim 8, wherein said joint portion is formed separately from said joint body.

11. A branch pipe joint for a high pressure fluid, comprising:
    a joint body having an inner circumferential wall defining a first conduit, said first conduit extending along an axis, and a branch hole, said branch hole being formed in said circumferential wall;
    a generally tubular joint portion extending from said joint body and terminating in a pressure receiving seat;
    a branch pipe having a second conduct and a joint head formed at the end thereof, said joint head defining a pressure seat, said pressure seat being formed to abuttingly engage said pressure receiving seat;
    a nut coupling said branch pipe to said joint portion with said pressure seat being in abuttinging engagement with said pressure receiving seat, therby to join said branch pipe to said joint body,
    wherein said branch hole is formed with an elliptical shape having a longer diameter disposed in a direction generally normal to said axis, and said branch hole being offset from the center of the first conduit of said joint body in the direction generally normal to said axis.

12. A branch pipe joint for a high-pressure fluid according to claim 11,
    wherein said branch hole is formed with two ends spaced apart along said longer diameter, and wherein the offset of said branch hole is so determined that the tangent of said circumferential wall is substantially aligned with one said end of said branch hole.

13. A branch pipe joint for a high-pressure fluid according to claim 11, wherein said joint portion is formed integrally with said joint body.

14. A branch pipe joint for a high-pressure fluid according to claim 11, wherein said joint portion is formed separately from said joint body.

* * * * *